US011009106B2

(12) United States Patent
Vegh et al.

(10) Patent No.: US 11,009,106 B2
(45) Date of Patent: May 18, 2021

(54) METHOD AND SYSTEM FOR TENSIONING A DRIVE BELT

(71) Applicant: INTELLIGRATED HEADQUARTERS, LLC, Mason, OH (US)

(72) Inventors: Mark Kenneth Vegh, Frederick, MD (US); Murat Lee Newman, Leesburg, VA (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/407,668

(22) Filed: May 9, 2019

(65) Prior Publication Data

US 2020/0355246 A1 Nov. 12, 2020

(51) Int. Cl.
*B65G 23/00* (2006.01)
*B65G 39/16* (2006.01)
*B65G 23/44* (2006.01)
*F16H 7/14* (2006.01)
*F16H 7/08* (2006.01)

(52) U.S. Cl.
CPC ............ *F16H 7/14* (2013.01); *B65G 23/44* (2013.01); *F16H 2007/088* (2013.01); *F16H 2007/0893* (2013.01)

(58) Field of Classification Search
None
See application file for complete search history.

(56) References Cited

U.S. PATENT DOCUMENTS 2,640,367 A * 6/1953 Rieser .................. F16H 57/025
474/72
2,925,740 A * 2/1960 Chung .................. F16H 57/031
248/666

(Continued)

FOREIGN PATENT DOCUMENTS

| CN | 105836391 B | 9/2018 |
|----|-------------|--------|
| DE | 29516386 U1 | 2/1997 |
| KR | 1995-0010530 | 4/1995 |

OTHER PUBLICATIONS

Extended European Search Report issued in European Application No. 20173345.8 dated Oct. 12, 2020, 12 pages.

*Primary Examiner* — Kavel Singh
(74) *Attorney, Agent, or Firm* — Alston & Bird LLP

(57) ABSTRACT

The present disclosure relates to a drive belt tensioning system that comprises drive assembly detachably attached with mounting bracket. The drive assembly comprises assembly plate, driving mechanism rigidly affixed to the assembly plate, and driving pulley shaft protruding through assembly plate. First axis of rotation of the driving mechanism perpendicular to the assembly plate defines center of rotation of the drive assembly. The driving pulley shaft is positioned at first radial distance from the center of rotation of the drive assembly. The mounting bracket defines shaft aperture sized to receive the driving mechanism and radial driving pulley slot that extending circumferentially around a portion of the shaft aperture and sized to receive the driving pulley shaft. An application of torque causes arcuate motion of the driving pulley shaft in the radial driving pulley slot such that distance between the driven pulley and the driving pulley is altered.

13 Claims, 7 Drawing Sheets

(56) References Cited

U.S. PATENT DOCUMENTS

| | | | |
|---|---|---|---|
| 3,593,591 A | | 7/1971 | Chantland |
| 3,628,387 A | * | 12/1971 | Gaskell .................. B65G 23/44 |
| | | | 74/89 |
| 4,568,318 A | | 2/1986 | Johnson et al. |
| 4,767,383 A | | 8/1988 | St. John |
| 5,174,435 A | * | 12/1992 | Dorner .................. B65G 23/44 |
| | | | 198/806 |
| 6,209,715 B1 | * | 4/2001 | Eltvedt .................. B65G 21/06 |
| | | | 198/813 |
| 6,971,509 B2 | * | 12/2005 | Ertel ..................... B65G 21/06 |
| | | | 198/813 |
| 8,585,292 B2 | * | 11/2013 | Boeing .................. F16C 23/06 |
| | | | 384/260 |

* cited by examiner

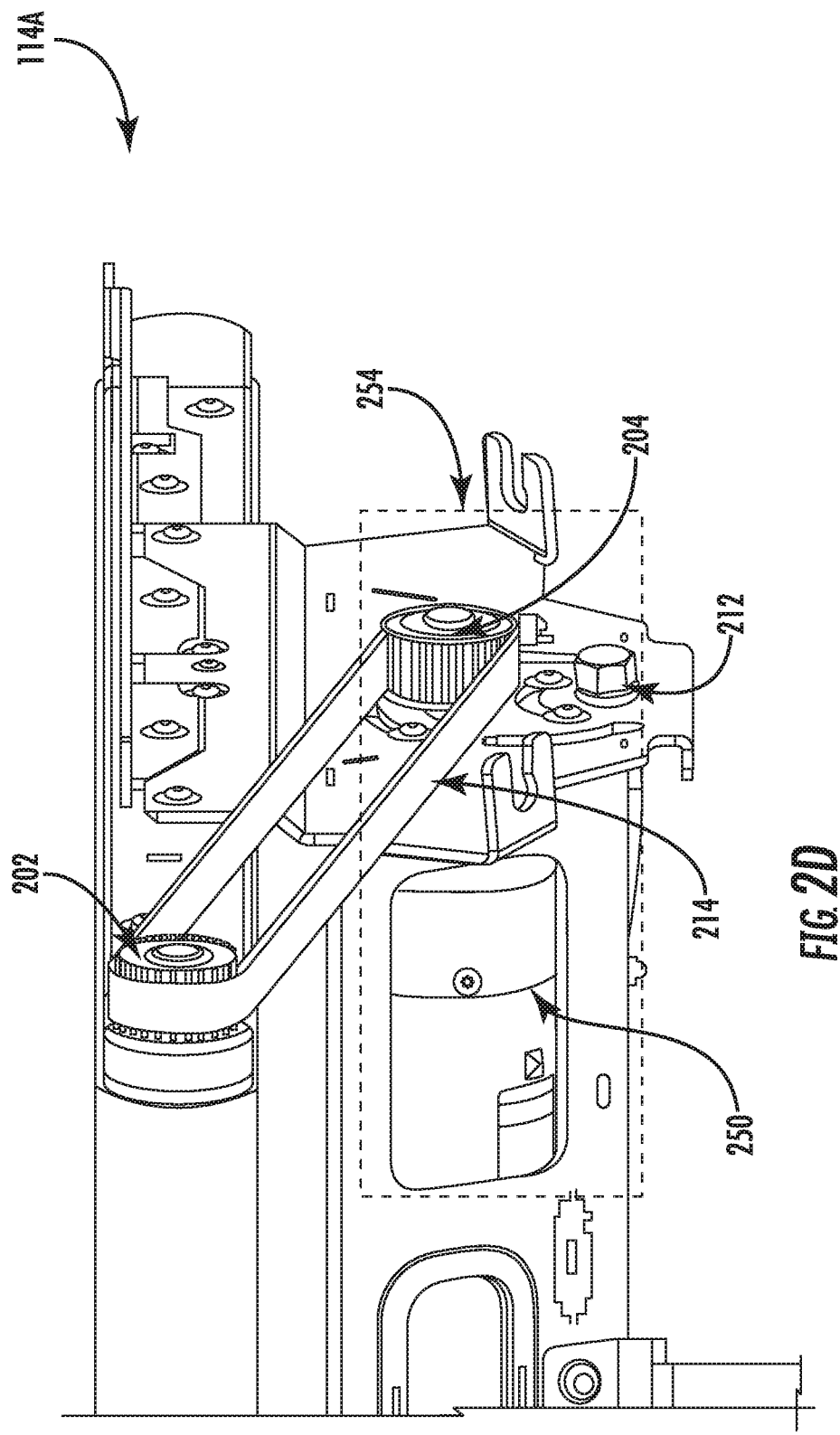

METHOD AND SYSTEM FOR TENSIONING A DRIVE BELT

TECHNICAL FIELD

The present disclosure relates generally to a material handling system, and more specifically relates to a method and system for tensioning a drive belt in the material handling system.

BACKGROUND

Drive belts, such as timing belts, are used in drive applications, such as cross belt sorters, where various parameters, such as position, speed, and torque transmission capability, are critical in a material handling system. The drive belt is used to transmit torque from a servo controlled gear motor to a driven pulley, via a driving pulley. The driven pulley, in-turn, moves a product on a transport belt. Applicant has identified several technical challenges associated with the belt tension of the drive belt. Through applied effort, ingenuity, and innovation, many of these identified challenges have been overcome by developing solutions that are included in embodiments of the present invention, many examples of which are described in detail herein.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

The illustrative embodiments of the present disclosure relate to systems and methods for tensioning drive belts. According to at least one aspect of the present disclosure, a drive belt tensioning system is provided that comprises a drive assembly and a mounting bracket. The drive assembly may further comprise an assembly plate, a driving mechanism, and a driving pulley shaft. The driving mechanism may be rigidly affixed to the assembly plate. A first axis of rotation of the driving mechanism perpendicular to the assembly plate may define a center of rotation of the drive assembly. The driving pulley shaft may protrude through the assembly plate. The driving pulley shaft may be positioned at a first radial distance from the center of rotation of the drive assembly and is configured to mate with a driving pulley sprocket wheel. The mounting bracket may be detachably attached to the drive assembly and rigidly affixable orthogonally to a first surface of a carrier unit of a conveyor bed having a driven pulley. The mounting bracket may define at least a shaft aperture that is sized to receive the driving mechanism and a radial driving pulley slot that extends circumferentially around at least a portion of the shaft aperture, the radial driving pulley slot sized to receive the driving pulley shaft. An application of torque on the driving mechanism about the center of rotation of the drive assembly may cause arcuate motion of the driving pulley shaft in the radial driving pulley slot about the center of rotation of the drive assembly such that a distance between the driven pulley and the driving pulley is altered.

According to one or more embodiments of the present disclosure, the drive assembly may further comprise a drive motor having a drive pinion. The drive pinion may be attached to the driving pulley shaft and may rotate the driving pulley shaft about a corresponding longitudinal axis.

According to one or more embodiments of the present disclosure, the center of rotation of the drive assembly may be defined based on the first axis of rotation of the driving mechanism that is coaxial with an axis of rotation of the radial driving pulley slot. A second axis of rotation of the drive pinion that is coaxial with an axis of rotation of the driving pulley shaft may define a first point of rotation of the driving pulley.

According to one or more embodiments of the present disclosure, the applied torque may allow the driving mechanism to rotate about the center of rotation and the driving pulley shaft to move through a length of the radial driving pulley slot.

According to one or more embodiments of the present disclosure, based on the applied torque, a current perpendicular distance defined between a first lateral axis and a second lateral axis may be changed to an updated perpendicular distance defined between an updated first lateral axis and an updated second lateral axis. The first lateral axis may pass through the first point of rotation of the driving pulley and a second point of rotation corresponding to a third axis of rotation of the driven pulley shaft. The second lateral axis may pass through the center of rotation of the drive assembly such that the first lateral axis is parallel to the second lateral axis. The updated first lateral axis may pass through an updated first point of rotation of the driving pulley and the second point of rotation. The updated second lateral axis may pass through the center of rotation of the drive assembly such that the updated first lateral axis is parallel to the updated second lateral axis.

According to one or more embodiments of the present disclosure, based on the applied torque driving mechanism resulting in the updated perpendicular distance between the updated first lateral axis and the updated second lateral axis, a drive belt tension of the drive belt may be adjusted to match with a pre-defined drive belt tension of the drive belt due to the altered distance between the driven pulley and the driving pulley upon the applied torque on the driving mechanism about the center of rotation of the drive assembly. The drive belt may mate with the driving pulley sprocket wheel of the driving pulley and a driven pulley sprocket wheel of the driven pulley. The driven pulley sprocket wheel may be received at an end portion of the driven pulley. A cross belt of the carrier unit of the conveyor bed may mate with the driven pulley and another pulley of the carrier unit.

According to one or more embodiments of the present disclosure, based on the applied torque in clockwise direction resulting in the updated perpendicular distance between the updated first lateral axis and the updated second lateral axis, a drive belt tension of a drive belt may increase to match with an optimum pre-defined drive belt tension of the drive belt. Alternately, according to one or more embodiments of the present disclosure, based on the applied torque in anti-clockwise direction resulting in the updated perpendicular distance between the updated first lateral axis and the updated second lateral axis, a drive belt tension of the drive belt may decrease to match with an optimum pre-defined drive belt tension of the drive belt.

According to one or more embodiments of the present disclosure, the assembly plate may further define a plurality of circumferential grooves configured to receive a plurality of locking bolts through a plurality of radial slots defined on the mounting bracket. An axis of rotation of the plurality of radial slots is coaxial with the first axis of rotation of the driving mechanism.

According to one or more embodiments of the present disclosure, the plurality of locking bolts may be configured to be loosened so as to allow the driving mechanism to rotate about the center of rotation and the driving pulley shaft to arcuately move through length of the radial driving pulley slot. After the application of the torque on the driving mechanism, the plurality of locking bolts may be fastened tightly in the plurality of circumferential grooves.

According to one or more embodiments of the present disclosure, the driving mechanism may be one of a shaft of a defined shape and dimensions, a nut shaft of a specific shape and dimensions rigidly fixed on the assembly plate, a slot, Torx, Philips or a socket head drive style in accordance with available space and access requirements. The driving pulley shaft may receive a driving sprocket wheel from opposite surface of the assembly plate.

According to another aspect of the present disclosure, a method for tensioning the drive belt is provided. The method may include loosening a plurality of locking bolts engaged with a plurality of circumferential grooves defined in an assembly plate through a plurality of radial slots defined in a mounting bracket, wherein the mounting bracket is detachably attached to a drive assembly in a drive belt tensioning system. The method may further include applying a torque on a driving mechanism by a drive device about a center of rotation of the drive assembly, the driving mechanism being rigidly affixed to the assembly plate, wherein a first axis of rotation of the driving mechanism perpendicular to the assembly plate defines the center of rotation of the drive assembly. The torque may be applied in one of a first or a second direction about the center of rotation of the drive assembly based at least on a current perpendicular distance between a first lateral axis and a second lateral axis. The first lateral axis may pass through a first point of rotation of a driving pulley and a second point of rotation defined by a third axis of rotation of a driven pulley shaft. The second lateral axis may pass through the center of rotation of the drive assembly such that the first lateral axis is parallel to the second lateral axis. The applied torque on the driving mechanism may allow the driving mechanism of the drive assembly to rotate about the center of rotation of the drive assembly and a driving pulley shaft to move through a length of a radial driving pulley slot. The drive belt tension of a drive belt may be adjusted to match with an optimum pre-defined drive belt tension of the drive belt based on an updated perpendicular distance between an updated first lateral axis and an updated second lateral axis, the drive belt mating with a driving pulley sprocket wheel of the driving pulley and a driven pulley sprocket wheel of a driven pulley. The method may further include fastening the plurality of locking bolts tightly against the plurality of circumferential grooves defined in the assembly plate through the plurality of radial slots defined in the mounting bracket.

According to one or more embodiments of the present disclosure, the applied torque may be further based on at least the optimum pre-defined drive belt tension of the drive belt. The first lateral axis may pass through the first point of rotation and the second point of rotation. The second lateral axis may pass through the center of rotation of the drive assembly such that the first lateral axis is parallel to the second lateral axis. The center of rotation of the drive assembly may be defined based on at least the first axis of rotation of the driving mechanism that is coaxial with an axis of rotation of the radial driving pulley slot. The first point of rotation of the driving pulley may be defined based on a second axis of rotation of a drive pinion that is coaxial with an axis of rotation of the driving pulley shaft.

According to another aspect of the present disclosure, a conveyor bed is provided that comprises a plurality of carrier units, each carrier unit having a cross belt mating with a driven pulley and another pulley of corresponding carrier unit. The conveyor bed may further comprise a drive assembly having at least an assembly plate, wherein the assembly plate defines a plurality of circumferential grooves, a protruding driving pulley shaft of a driving pulley, and a driving mechanism rigidly defined on a proximal surface of the assembly plate. The conveyor bed may further comprise a drive belt that is configured to mate with a driving pulley sprocket wheel of the driving pulley and a driven pulley sprocket wheel of the driven pulley. The conveyor bed may further comprise a mounting bracket orthogonally mounted at a first surface of a first carrier unit of and configured to be slidably abutted with the assembly plate. The mounting bracket may define a radial driving pulley slot, a plurality of radial slots, and a shaft aperture. The radial driving pulley slot and the shaft aperture may be configured to receive the protruding driving pulley shaft and the driving mechanism, respectively, from the drive assembly at a distal surface of the mounting bracket. At least a first axis of rotation of the driving mechanism that is coaxial with the axis of rotation of the radial driving pulley slot may define a center of rotation of the drive assembly. An application of torque on the driving mechanism about the center of rotation by a drive device may cause arcuate motion of the driving pulley shaft in the radial driving pulley slot about the center of rotation of the drive assembly resulting in an updated perpendicular distance between an updated first lateral axis and an updated second lateral axis. A drive belt tension of the drive belt may be adjusted to match with a pre-defined drive belt tension of the drive belt due to the updated perpendicular distance upon the application of the torque on the driving mechanism about the center of rotation.

According to one or more embodiments of the present disclosure, the plurality of radial slots may be configured to receive a plurality of locking bolts at a proximal surface of the mounting bracket and fastened in the plurality of circumferential grooves defined on the proximal surface of the assembly plate.

According to one or more embodiments of the present disclosure, the applied torque may be based on the optimum pre-defined drive belt tension of the drive belt and a current perpendicular distance between a first lateral axis and a second lateral axis.

According to one or more embodiments of the present disclosure, based on the applied torque in clockwise direction resulting in the updated perpendicular distance between the updated first lateral axis and the updated second lateral axis, the drive belt tension of a drive belt may increase to match with the optimum pre-defined drive belt tension of the drive belt.

According to one or more embodiments of the present disclosure, based on the applied torque in anti-clockwise direction resulting in the updated perpendicular distance between the updated first lateral axis and the updated second lateral axis, the drive belt tension of the drive belt may decrease to match with the optimum pre-defined drive belt tension of the drive belt.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 2A to 2D illustrate various perspective views of a portion of the loop sorter of FIG. 1 with a plurality of carrier units, in accordance with an embodiment of present disclosure.

DESCRIPTION

Figure 1:
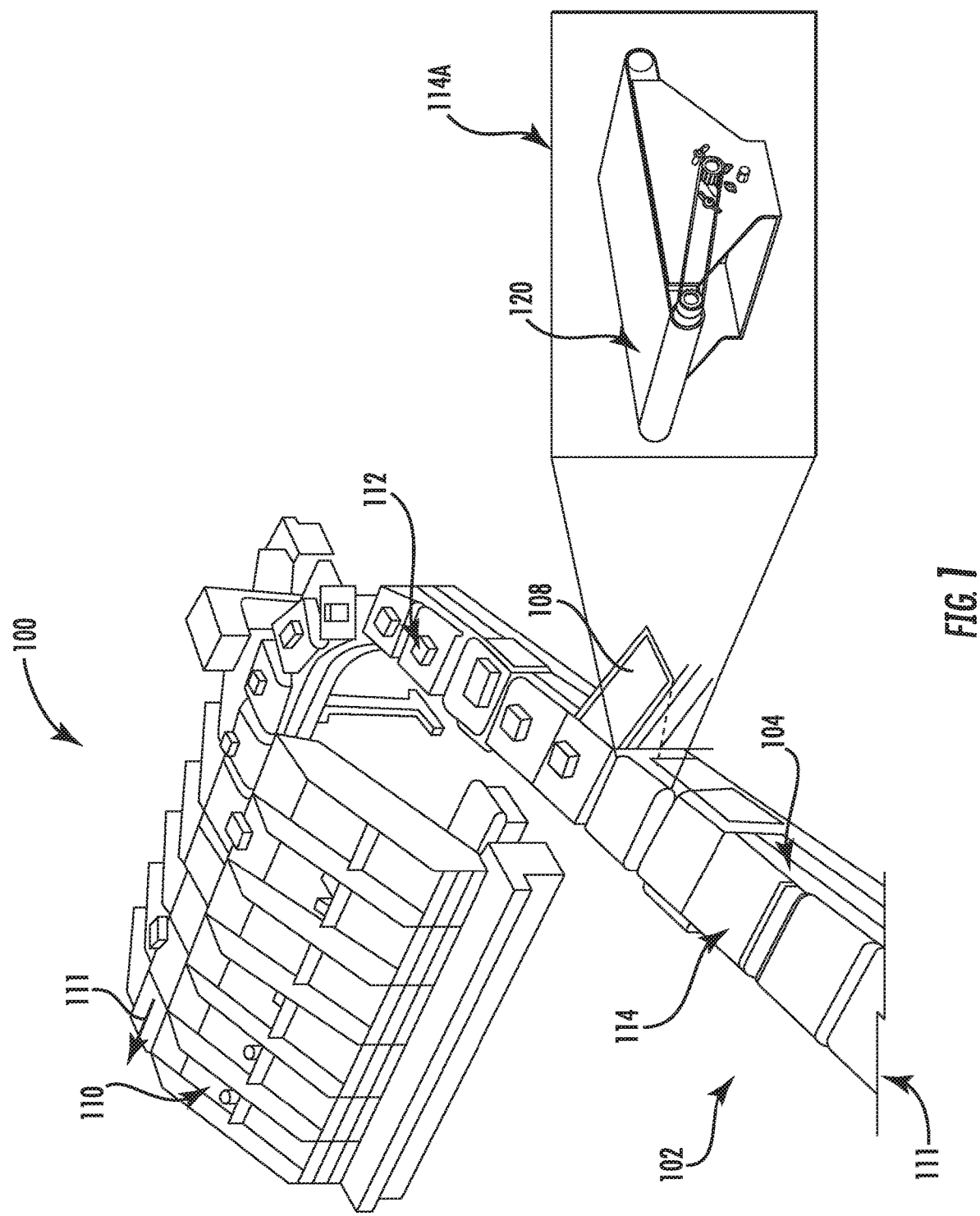
FIG. 1 illustrates a perspective view of a material handling system that includes a loop sorter with multiple carrier units installed in a continuous closed loop path, in accordance with an embodiment of present disclosure.

Some embodiments of the present invention will now be described more fully hereinafter with reference to the accompanying drawings, in which some, but not all embodiments of the inventions are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the invention described herein such that embodiments may include fewer or more components than those shown in the figures while not departing from the scope of the invention.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art of the present disclosure that these concepts may be practiced without these specific details.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

In material handling systems, if the belt tension of the drive belt (e.g., timing belt), such as toothed belts, is less than an optimum value, the torque transmission capability of the drive belt may be degraded. On the other hand, for cases in which the belt tension of the drive belt exceeds the optimum value, the component life of the drive and driven components may be degraded. To maximize torque transmission capability and experience an extended service life, the belt tension should remain at an optimum value or at substantially an optimum value during operation.

The system and method of tensioning drive belts described herein, in accordance with one or more example embodiments, relies on a fixed center of rotation that is defined by a driving mechanism, upon which when a torque is applied, a drive assembly rotates around the fixed center of rotation to create or reduce tension on a drive belt. Thus, the system and method of tensioning drive belts described herein, in accordance with one or more example embodiments of the present disclosure are implemented to achieve, in some example, accurate and repeatable belt tension in the drive belt even in bi-directional drive systems.

FIG. 1 illustrates a perspective view of a material handling system 100, in accordance with an example embodiment of present disclosure. The material handling system 100 may include a conveyor 102 that includes a conveyor bed 104. The conveyor bed 104 may correspond to a top surface of the conveyor 102 that includes a plurality of cross belts reeved on top of a plurality of carrier units 114. Thus, the conveyor bed 104 of the conveyor 102 may be adapted to support the load 112. Examples of the load 112 may include, but are not limited to, articles, packages, cartons, objects, and the like that may be supported thereon.

The material handling system 100 may further include an induction station 108 positioned adjacent to the conveyor 102. The material handling system 100 further includes discharge chutes 110 positioned at an end, for example, discharge end of the conveyor 102 succeeding the induction station 108. Thus, the conveyor 102 is configured to transfer a load 112, for example, one or more objects supported thereon, from one location to another location, for example, from the induction end to the discharge end of the conveyor 102. Examples of the conveyor 102 may include, but are not limited to, a sortation conveyor. According to one or more other embodiments, the conveyor 102 may be any of a cross belt loop sorter, a tilt tray sorter, pusher type sorter and the like.

According to an embodiment, each of the plurality of carrier units 114, for example a carrier unit 114A, may include a cross belt 120 reeved around it (as shown in the break out view of FIG. 1). According to another embodiment, each of the carrier units 114 may include tilt trays (not shown). The plurality of carrier units 114 are endlessly conveyed on the conveyor bed 104 in a looping direction indicated by arrows 111. For example, the plurality of carrier units 114 trace a closed loop path indicated by arrows 111. The plurality of carrier units 114, carrying the load 112 inducted from the induction station 108, may deliver the load 112 at the discharge chutes 110, and upon delivering the load 112, the plurality of carrier units 114 may return back to the induction station 108 tracing the closed loop path in the looping direction indicated by the arrows 111. In this manner, the plurality of carrier units 114 are endlessly conveyed on the conveyor bed 104 to receive the load 112, deliver the load 112 to appropriate discharge chutes 110, and return back to receive next load 112 from the induction station 108. The general structure of the carrier unit 114A of the plurality of carrier units 114 has been shown as a breakout view in FIG. 1. The detailed construction of the carrier units 114A of the plurality of carrier units 114 will be further described in following figures.

FIGS. 2A to 2D illustrate various perspective views of an exemplary carrier unit of the loop sorter of FIG. 1, in accordance with an embodiment of present disclosure. In the embodiment shown in FIGS. 2A to 2D, the carrier unit 114A of the plurality of carrier units 114 is described. It may be noted that for brevity, only the construction and working of the carrier unit 114A has been explained in detail herein. However, it may be understood that the other carrier units of the plurality of carrier units 114 are identical or similar in their construction and working of the carrier unit 114A.

Figure 2A:
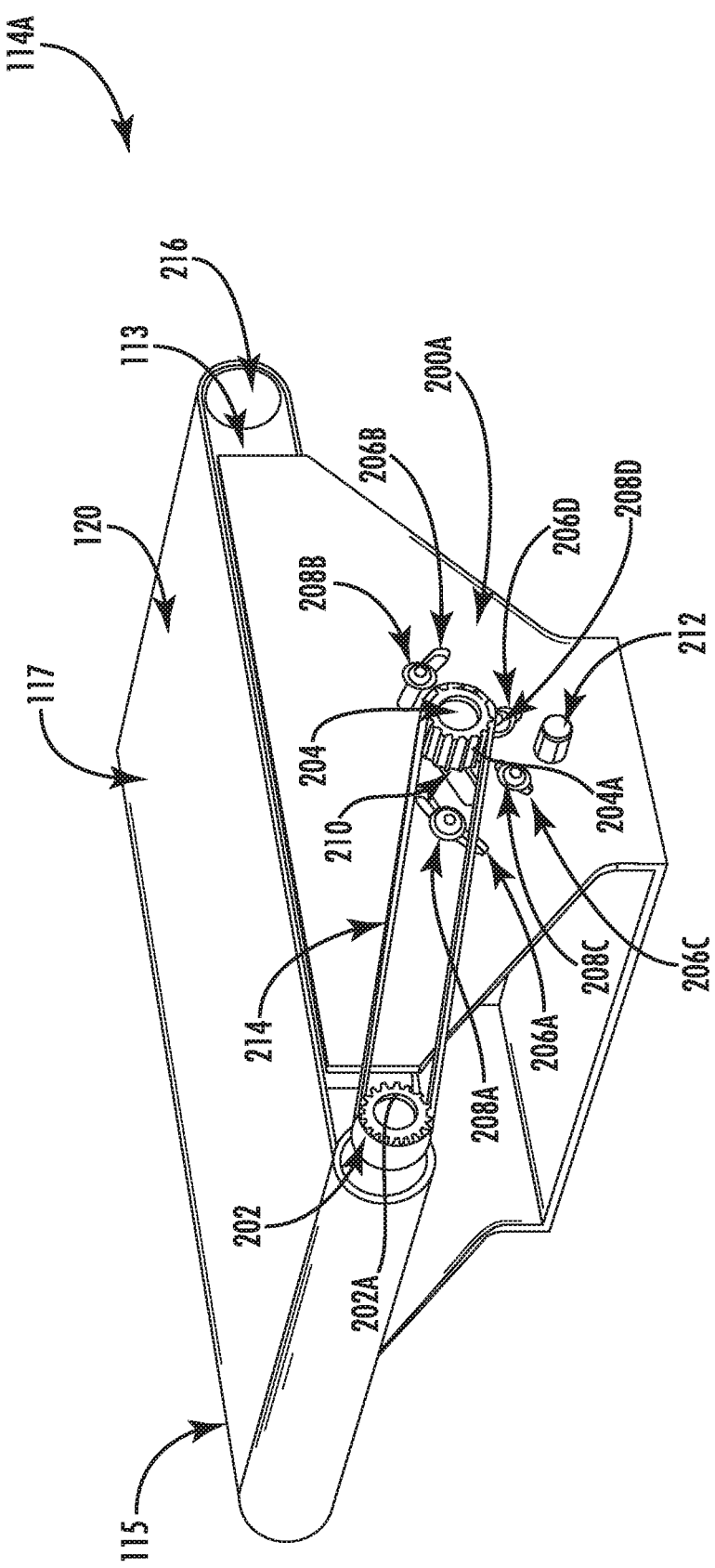

Referring to FIG. 2A, FIG. 2A illustrates a mounting bracket 200A in a first configuration, a driven pulley 202, and a driving pulley 204. The mounting bracket 200A may be rigidly affixable orthogonally to a first surface 113 of the carrier unit 114A of the conveyor bed 104. In accordance with the first configuration of the mounting bracket 200A, there are shown a plurality of radial slots 206A to 206D and a radial driving pulley slot 210. FIG. 2A further shows a plurality of locking bolts 208A to 208D, a driving mechanism 212, a drive belt 214, and the cross belt 120.

Further shown a first surface 113, a second surface 115, a top surface $114_{Top}$, and a bottom surface (not shown) of the carrier unit 114A. The first surface 113 of the carrier unit 114A, which may be the proximal surface of the carrier unit 114A, is opposite to the second surface 115, which may be the distal surface of the carrier unit 114A. The first surface 113 and the second surface 115 may be positioned along a direction parallel to the direction of travel of the load 112 indicated by arrow 111 (FIG. 1). The top surface 117 being perpendicular to both the first surface 113 and second surface 115 and parallel to the bottom surface, wherein the top surface 117 receives the cross belt 120.

The mounting bracket 200A in the first configuration may correspond to a metallic plate of substantially a trapezoidal shape with the longer of the parallel axis being rigidly affixable orthogonally to the first surface 113 of the carrier unit 114A of the conveyor bed 104. Alternatively or additionally, in other example embodiments, the metallic plate may take on another shape, such as a rectangular or circular shape.

Figure 2B:
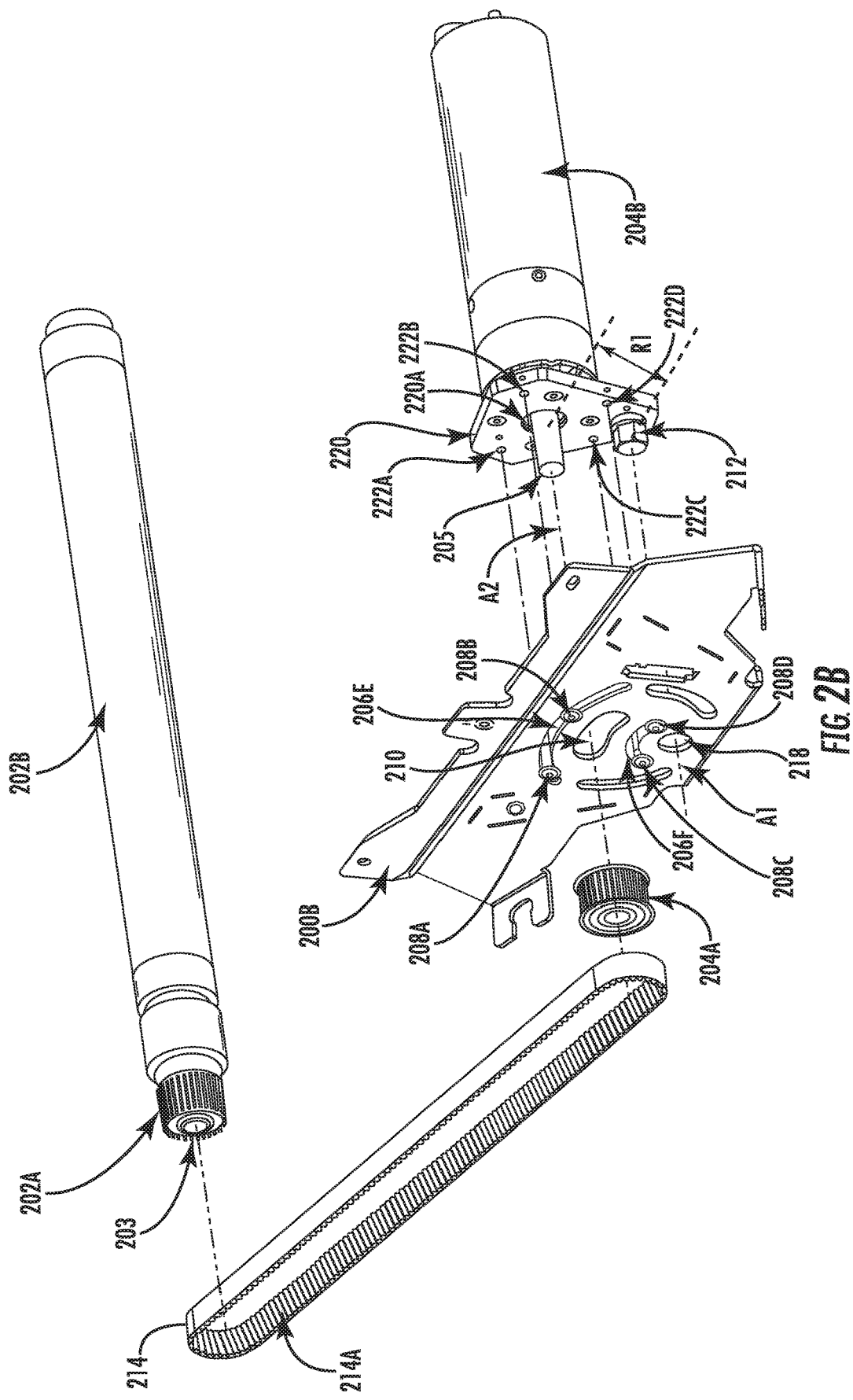
Figure 2C:
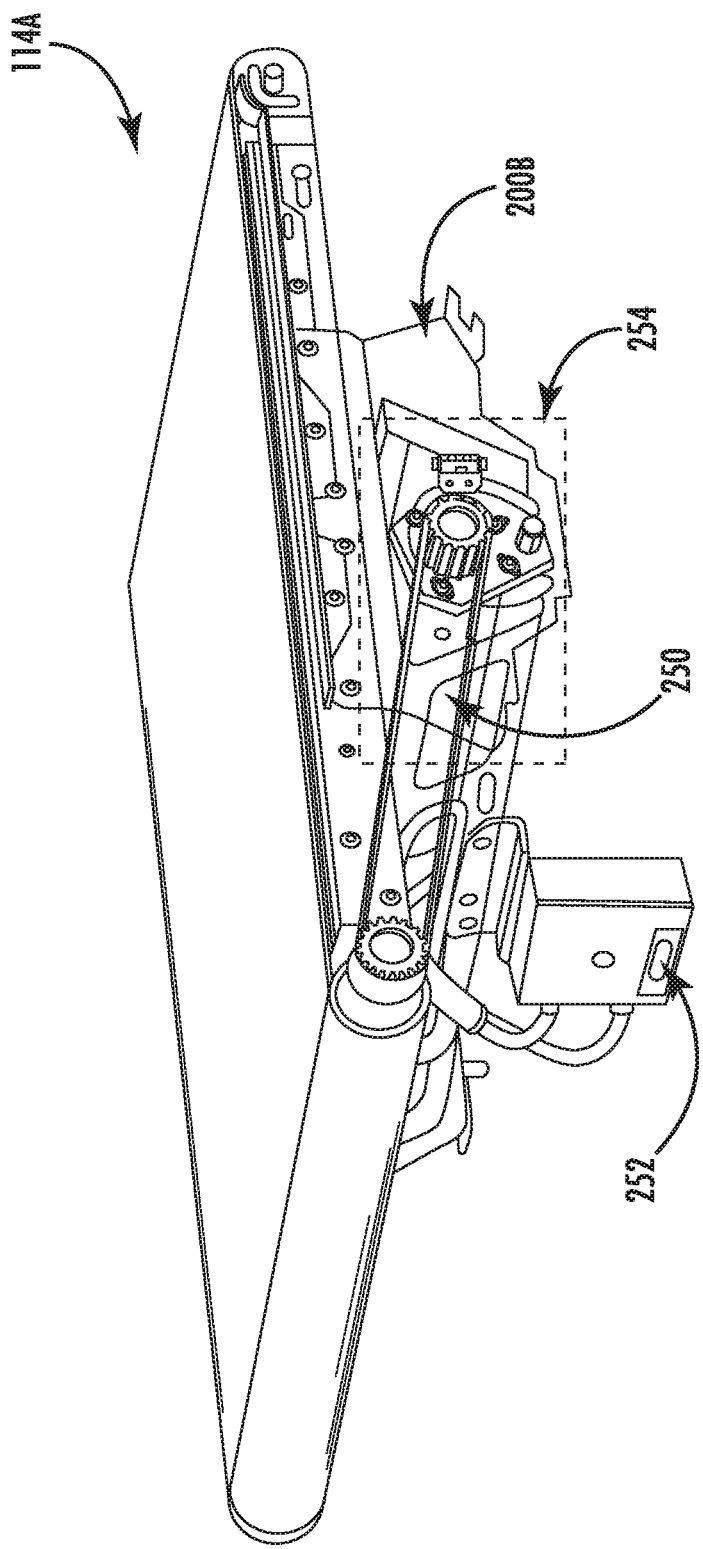

The mounting bracket 200A may include various slots and apertures that are suitably sized to detachably receive various members of a drive assembly (shown as a drive assembly 254 in FIGS. 2C and 2D). Examples of such members may include, but are not limited to, the driving mechanism 212 and the shaft of the driving pulley 204.

The driven pulley 202 may be rotatably affixed to the first surface 113 of the carrier unit 114A of the conveyor bed 104 such that a longitudinal axis of the driven pulley 202 is orthogonal to the first surface 113 of the carrier unit 114A. The cross belt 120 may be reeved around the driven pulley 202 and another pulley 216 of the carrier unit 114A to form a portion of the conveyor bed 104. The driven pulley 202 corresponds to a pulley member of the carrier unit 114A and receives a torque transmitted by a drive motor (shown as drive motor 250 in FIG. 2C) through the shaft of the driving pulley 204 using the drive belt 214.

The driving pulley 204 may be rotatably affixed to the mounting bracket 200A of the carrier unit 114A of the conveyor bed 104 such that a longitudinal axis of the driving pulley 204 is orthogonal to the surface of the mounting bracket 200A, as well as the first surface 113 and the second surface 115 of the carrier unit 114A. The shaft of the driving pulley 204 may be received through the radial driving pulley slot 210 from the distal end of the mounting bracket 200A. From the proximal end of the mounting bracket 200A, the shaft of the driving pulley 204 may receive a driving pulley sprocket wheel (shown as driving pulley sprocket wheel 204A in FIG. 2B) and thus, the driving pulley 204 is engaged with the mounting bracket 200A through the radial driving pulley slot 210. The driving pulley 204 may correspond to a pulley member of the carrier unit 114A that receives a torque directly from the drive motor (shown as drive motor 250 in FIG. 2C) and transmits the torque to the driven pulley 202 using the drive belt 214.

Each of the plurality of radial slots 206A to 206D may correspond to an aperture that extends circumferentially around at least a portion of a shaft aperture (shown as shaft aperture 218 in FIG. 2B). The curvature of each of the plurality of radial slots 206A to 206D may be such that the center of rotation of each of the plurality of radial slots 206A to 206D is coaxial with the axis of rotation of the drive assembly (shown as drive assembly 254 in FIG. 2C). Through the plurality of radial slots 206A to 206D, circumferential grooves (shown as a plurality of circumferential grooves 222A to 222D in FIG. 2B) defined in the assembly plate 220 (FIG. 2B) and positioned towards the distal surface of the mounting bracket 200A, may receive the plurality of locking bolts 208A to 208D from the proximal surface of the mounting bracket 200A.

The radial driving pulley slot 210 may correspond to an aperture that extends circumferentially around at least a portion of a shaft aperture (shown as shaft aperture 218 in FIG. 2B). The curvature of each of the radial driving pulley slot 210 may be such that the center of rotation of the radial driving pulley slot 210 is coaxial with the axis of rotation of the drive assembly (shown as drive assembly 254 in FIG. 2C). Through the radial driving pulley slot 210, shaft of the driving pulley 204 (shown as driving pulley shaft 205 in FIG. 2B) may be received from the distal surface of the mounting bracket 200A. From the proximal end of the mounting bracket 200A, the shaft of the driving pulley 204 may receive a driving pulley sprocket wheel (shown as driving pulley sprocket wheel 204A in FIG. 2B) and thus, the driving pulley 204 is engaged with the mounting bracket 200A through the radial driving pulley slot 210.

Each of the plurality of locking bolts 208A to 208D may correspond to a locking mechanism that engages with or disengages from the plurality of circumferential grooves 222A to 222D through the radial slots 206A to 206D provided in the mounting bracket 200A in accordance with the embodiment described in FIG. 2A. In an embodiment, the plurality of locking bolts 208A to 208D may be loosened to disengage from the plurality of circumferential grooves 222A to 222D so as to allow for the rotation of the drive assembly 254 about the center of rotation of the drive assembly 254. In another embodiment, the plurality of locking bolts 208A to 208D may be fastened or otherwise tightened to engage with the plurality of circumferential grooves 222A to 222D so as to allow the driving mechanism 212 to lock and secure the drive assembly 254 in place with respect to the mounting bracket 200A.

The driving mechanism 212 may correspond a shaft of a defined shape and dimensions, such as a nut shaft of a specific shape and dimensions rigidly fixed on the assembly plate 220. The end of driving mechanism 212 may take the form of a slot, Torx, Philips or a socket head drive style in accordance with available space and access requirements. The driving mechanism 212 may be rigidly affixed to the assembly plate 220, as illustrated in FIG. 2B. The longitudinal axis of the driving mechanism 212 may be perpendicular to the surface of the mounting bracket 200A. The driving mechanism 212 may be received by the shaft aperture 218 that is defined in the mounting bracket 200A at a location such that the longitudinal axis of the driving mechanism 212 is coaxial with the center of rotation of the drive assembly 254. Through the shaft aperture 218, the driving mechanism 212 may be received from the distal surface of the mounting bracket 200A and appear as a protruding member from the proximal end of the mounting bracket 200A. In the embodiment shown in FIG. 2A, the first surface 113 of the carrier unit 114A receives the mounting bracket 200A and the driven pulley 202. The mounting bracket 200A may further receive a corresponding driving pulley 204, which in turn may be connected to a shaft of a motor (such as a drive motor 250 shown in FIG. 2D) provided on the conveyor bed 104. The drive belt 214 may mate with the driven pulley 202 and the driving pulley 204 to transmit power from the motor through friction, thus rotating the driven pulley 202 via the driving pulley 204.

Referring to FIG. 2B, there is shown an exploded view of another mounting bracket 200B in a second example configuration. FIG. 2B illustrates a driven pulley sprocket wheel 202A, a driven pulley portion 202B, and a driven pulley shaft 203 corresponding to the driven pulley 202. There is further shown a driving pulley sprocket wheel 204A, a driving pulley portion 204B, and a driving pulley shaft 205 corresponding to the driving pulley 204. There is further shown a toothed inner face 214A of the drive belt 214.

The driven pulley sprocket wheel 202A may be a member of the driven pulley 202 that is a profiled wheel with teeth, or cogs, that mesh with the drive belt 214 at one end. The longitudinal axis of the driven pulley sprocket wheel 202A is coaxial with the longitudinal axis of the driven pulley shaft 203. The driven pulley sprocket wheel 202A may be removably attached with the driven pulley shaft 203.

The driven pulley portion 202B may correspond to a portion of the driven pulley 202 around which the cross belt 120 is reeved at a first end and includes pulley 216 at the second end. The reeved cross belt 120 corresponding to the carrier unit 114A forms a portion of the conveyor bed 104.

The driven pulley shaft 203 may correspond to an axle of the driven pulley 202 around which the driven pulley 202 rotates. The proximal end of the driven pulley shaft 203 may be configured to receive the driven pulley sprocket wheel 202A and the distal end of the driven pulley shaft 203 may be configured to receive the cross belt 120.

The driving pulley sprocket wheel 204A may be a member of the driving pulley 204 that is a profiled wheel with teeth, or cogs, that mesh with the drive belt 214 at opposite end. The longitudinal axis of the driving pulley sprocket wheel 204A is coaxial with the longitudinal axis of the driving pulley shaft 205. The driving pulley sprocket wheel 204A may be removably attached with the driving pulley shaft 205.

The driving pulley portion 204B may correspond to a portion of the driving pulley 204 that may be attached with the drive pinion (not shown) of the drive motor 250. The drive pinion of the drive motor 250 may rotate the driving pulley portion 204B and eventually the driving pulley 204. Said differently, the drive pinion of the drive motor 250 may transmit a torque to the driving pulley 204 through the driving pulley portion 204B. The torque is further transmitted to the driven pulley 202 via the drive belt 214.

The driving pulley shaft 205 may correspond to an axle of the driving pulley 204 around which the driving pulley 204 rotates. The proximal end of the driving pulley shaft 205 may be configured to receive the driving pulley sprocket wheel 204A and the distal end of the driving pulley shaft 205 may be attached with the drive pinion (not shown) of the drive motor 250. The driving pulley shaft 205 may protrude through the assembly plate 220, and may be positioned at a first radial distance R1 from the first axis of rotation A1. The driving pulley shaft 205 may be configured to be received by distal side of the mounting bracket 200B through the radial driving pulley slot 210, and mate with the driving pulley sprocket wheel 204A from proximal side of the mounting bracket 200B.

In accordance with the second configuration of the mounting bracket 200B, there are shown radial slots 206E and 206F, and a shaft aperture 218. Each of the radial slots 206E and 206F may correspond to an aperture that extends circumferentially around at least a portion of the shaft aperture 218. The curvature of each of the radial slots 206E and 206F may be such that the center of rotation of each of the radial slots 206E and 206F is coaxial with the axis of rotation of the drive assembly (shown as drive assembly 254 in FIG. 2C). Through the radial slots 206E and 206F, the plurality of circumferential grooves 222A to 222D defined in the assembly plate 220 and positioned towards the distal surface of the mounting bracket 200A, may receive the plurality of locking bolts 208A to 208D from the proximal surface of the mounting bracket 200B.

The shaft aperture 218 may be a slot defined in the mounting bracket 200B positioned towards the bottom of the mounting bracket 200B. The center point of the shaft aperture 218 is coaxial with the center of rotation of the drive assembly 254. The shaft aperture 218 may be sized to receive the driving mechanism 212 from the distal surface of the mounting bracket 200B.

An assembly plate 220, as shown in FIG. 2B, may be an inverted truncated triangular plate that defines various members. For example, substantially towards the centroid of the assembly plate 220 there may be defined an aperture 220A through which the driving pulley shaft 205 may protrude. The aperture 220A may receive the driving pulley shaft 205 from the distal surface. The assembly plate 220 may further define a plurality of circumferential grooves 222A to 222D around the aperture 220A. The circumferential grooves 222A and 222B may be located in proximity to the topmost truncated vertices of the assembly plate 220 and the circumferential grooves 222C and 222D may be located in proximity to the side edges and the bottom truncated vertex of the assembly plate 220. The plurality of circumferential grooves 222A to 222D may be configured to receive the plurality of locking bolts 208A to 208D through the radial slots 206E and 206F defined on the mounting bracket 200B. Further, the driving mechanism 212 is shown to be rigidly affixed towards the bottom truncated vertex of the assembly plate 220. According to an embodiment shown in FIG. 2B, the driving mechanism 212 may define a first axis of rotation A1 in a direction perpendicular to the assembly plate 220. The driving mechanism 212 may be one of a shaft of a defined shape and dimensions, a nut shaft of a specific shape and dimensions rigidly fixed on the assembly plate, a slot, Torx, Philips or a socket head drive style in accordance with available space and access requirements.

According to an embodiment shown in FIG. 2B, the drive belt 214 may be a timing belt. For example, timing belts are flat belts which are toothed on their inner face 214A. The toothed inner face 214A attaches to the driven pulley sprocket wheel 202A and the driving pulley sprocket wheel 204A corresponding to the driven pulley 202 and the driving pulley 204, respectively. In such scenarios, the power is transmitted via the toothed inner face 214A instead of friction between the drive belt 214 and the driven pulley 202. Since the cross belt 120 of the carrier unit 114A is reeved around the driven pulley portion 202B of the driven pulley 202, the rotation of the driven pulley 202 in turn causes the rotation of the cross belt 120 covering the carrier unit 114A.

The mounting bracket 200B may be detachably attached to a drive assembly (shown as a drive assembly 254 in FIGS. 2C and 2D) at distal surface of the mounting bracket 200B and rigidly affixable orthogonally to the first surface 113 of the carrier unit 114A of the conveyor bed 104. The shaft aperture 218 defined in the mounting bracket 200B may be sized to receive the driving mechanism 212 from the assembly plate 220 from the distal surface of mounting bracket 200B. Further, the radial driving pulley slot 210 defined in the mounting bracket 200B, that extends circumferentially around at least a portion of the shaft aperture 218, may be sized to receive the driving pulley shaft 205 from the assembly plate 220 from the distal surface of mounting bracket 200B.

Accordingly, the driving pulley sprocket wheel 204A is received from the proximal surface of the mounting bracket 200B and fitted on the driving pulley shaft 205 corresponding to the driving pulley 204. Also, the driven pulley sprocket wheel 202A is received and fitted on the driven pulley shaft 203 corresponding to the driven pulley 202. Once the driven pulley sprocket wheel 202A and the driving pulley sprocket wheel 204A are fitted on the driven pulley shaft 203 and the driving pulley shaft 205 respectively, the drive belt 214 mates with the driving pulley sprocket wheel 204A of the driving pulley 204 and a driven pulley sprocket wheel 202A of the driven pulley 202. Further, the cross belt 120 of the carrier unit 114A of the conveyor bed 104 mates with the driven pulley 202 and another pulley 216 of the carrier unit 114A.

Once in place during the factory setting, an initial drive belt tension is set, the proximal surface of the assembly plate 220 abuts the distal surface of the mounting bracket 200B, and the plurality of locking bolts 208A to 208D are fastened in the plurality of circumferential grooves 222A to 222D through the radial slots 206E and 206F provided in the mounting bracket 200B in accordance with the embodiment described in FIG. 2B. In the similar manner, the proximal surface of the assembly plate 220 abuts the distal surface of the mounting bracket 200A, and the plurality of locking bolts 208A to 208D are fastened in the plurality of circumferential grooves 222A to 222D through the plurality of radial slots 206A to 206D provided in the mounting bracket 200A, in accordance with the embodiment described in FIG. 2A.

Referring to FIGS. 2C and 2D, a partially transparent view and a perspective view, respectively, is shown of the carrier unit 114A, in accordance with an embodiment of the disclosure. Towards the proximal surface of the mounting bracket 200B, the driving pulley sprocket wheel 204A of the driving pulley 204, the plurality of locking bolts 208A to 208D, and the driving mechanism 212 are shown. Towards the distal surface of the mounting bracket 200B, the drive motor 250, such as a servo controlled gear motor powered and controlled by a control device 152, may be mounted. The drive pinion (not shown) of the drive motor 250 may be attached to the driving pulley shaft 205 and may rotate the driving pulley shaft 205 about a corresponding longitudinal axis A2 (shown in FIG. 2B). The drive motor 250 may transmit a torque to the driving pulley 204 through the driving pulley shaft 205. The torque is further transmitted to the driven pulley 202 using the drive belt 214. Thus, the cross belt 120 moves (in the forward or backward direction), therefore transferring the load 112 thereon.

In an embodiment, the assembly plate 220, the driving mechanism 212, the driving pulley 204, the drive motor 250, such as a servo controlled gear motor, including the plurality of locking bolts 208A to 208D as well, may be collectively referred to as a drive assembly 254, as illustrated in FIGS. 2C and 2D.

Figure 3A:
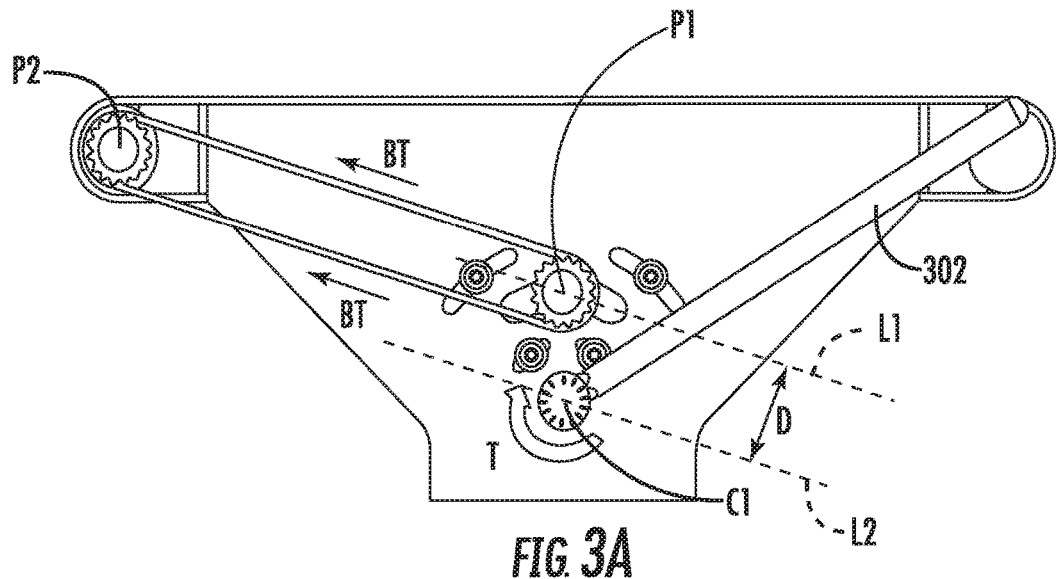
FIGS. 3A and 3B illustrate various views of the carrier unit 114A with the mounting bracket 200A, in accordance with various embodiments of the disclosure.
Figure 3B:
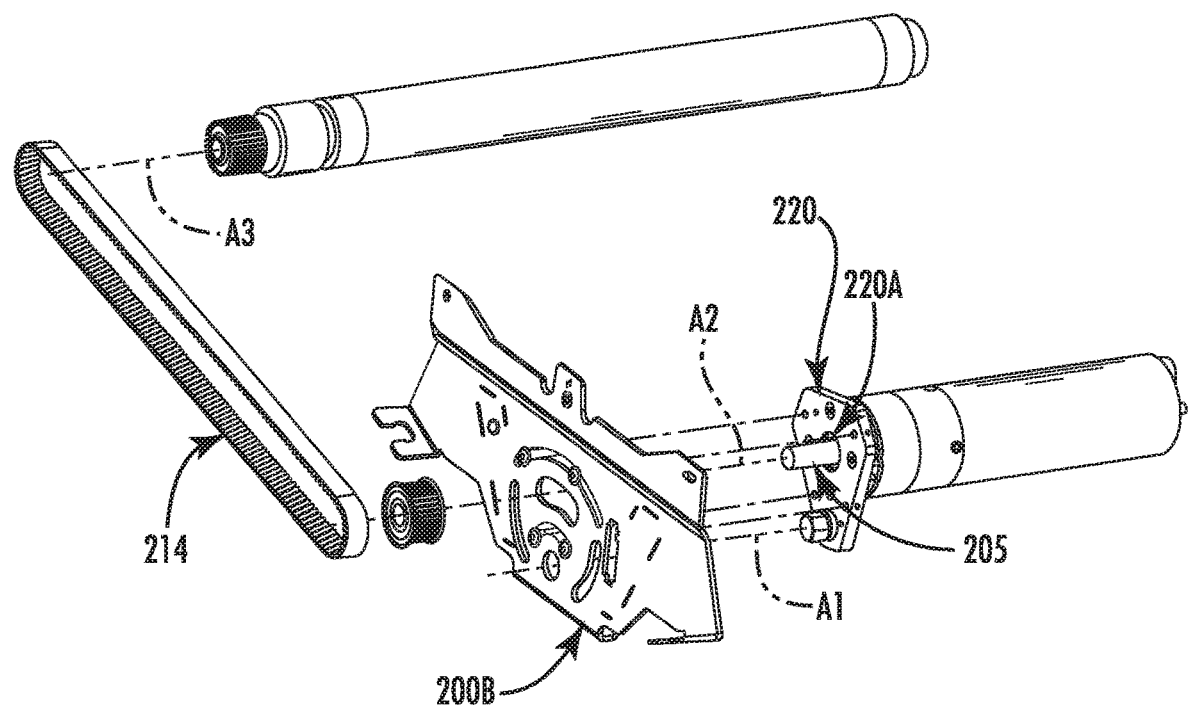

FIGS. 3A and 3B illustrate side views of the carrier unit 114A with the mounting bracket 200A and 200B, respectively, in accordance with various embodiments of the disclosure. As illustrated in FIGS. 3A and 3B, there may be defined a plurality of parameters, such as axis of rotation, center of rotation, lateral axis, and points of rotation, to describe the method for tensioning the drive belt 214 of the carrier unit 114A, as described in FIG. 4. The tensioning of the drive belt 214 of the carrier unit 114A may be performed by using a drive device 302, such as a torque wrench, as described hereinafter. Referring to FIG. 3A there is shown a center of rotation C1, a first point of rotation P1, a second point of rotation P2. There are further shown a first lateral axis L1 and a second lateral axis L2. Referring to FIG. 3B, a plurality of axis of rotation A1 to A6 are shown.

The first axis of rotation A1 corresponds to a longitudinal axis of the driving mechanism 212 that is perpendicular to the plane of the assembly plate 220 and the plane of the mounting bracket 200A. The first axis of rotation A1 is coaxial with an axis of rotation of a longitudinal axis corresponding to the center point of rotation of the radial driving pulley slot 210. Further, an axis of rotation of a longitudinal axis corresponding to the radial slots 206E and 206F (or the plurality of radial slots 206A to 206D) is coaxial with the first axis of rotation A1.

The second axis of rotation A2 corresponds to a longitudinal axis of the drive pinion (not shown) of the drive motor 250 that is perpendicular to the plane of the assembly plate 220 and the plane of the mounting bracket 200A. Further, an axis of rotation of a longitudinal axis of the driving pulley shaft 205 that is perpendicular to the plane of the assembly plate 220 and the plane of the mounting bracket 200A, is coaxial with the second axis of rotation A2.

The third axis of rotation A3 corresponds to a longitudinal axis of the driven pulley shaft 203 that is perpendicular to the plane of the assembly plate 220 and the plane of the mounting bracket 200A.

The center of rotation C1 may correspond to a center of rotation of the drive assembly 254 and is defined by the first axis of rotation A1 of the driving mechanism 212 that is coaxial with an axis of rotation of the radial driving pulley slot 210 and the sixth axis of rotation A6 of the radial slots 206E and 206F (or the plurality of radial slots 206A to 206D).

The first point of rotation P1 may correspond to a moving point of rotation defined by the second axis of rotation A2 of the drive pinion (not shown) that is coaxial with an axis of rotation of the driving pulley shaft 205.

The second point of rotation P2 may correspond to a fixed point of rotation defined by the third axis of rotation A3 of the driven pulley shaft 203.

Based on the center of rotation C1, the first point of rotation P1, and the second point of rotation P2, the first lateral axis L1 and the second lateral axis L2 may be defined. The first lateral axis L1 passes through the first point of rotation P1 and the second point of rotation P2, and the second lateral axis L2 passes through the center of rotation C1 of the drive assembly 254. The first lateral axis L1 is parallel to the second lateral axis L2. The perpendicular distance between the first lateral axis L1 and the second lateral axis L2 may be indicated by distance D.

Effectively, the distance D may vary based on a current distance between the driven pulley 202 and the driving pulley 204. The distance D may be different from a radial distance R1, which is a point-to-point distance between the first point of rotation P1 of the driving pulley 204 and the center of rotation C1 of the driving mechanism 212. However, when the position of the first point of rotation P1 of the driving pulley 204 is such that the second point of rotation P2, the first point of rotation P1, and the center of rotation C1 are at a right angle, the distance D may be equal to the radial distance between the first point of rotation P1 of the driving pulley 204 and the center of rotation C1 of the driving mechanism 212. At such distance D, the torque T required for tensioning the drive belt 214 may be calculated based on the expression (1), as provided below:

$$T = 2*D*BT \quad (1)$$

In an example use case, the drive belt 214 may be, for example, a Gates-90005MGT-15 belt which is a 5 mm pitch belt with a pitch length of 900 mm (e.g., 180 teeth) and a width of 15 mm. Further, the defined distance D may be, for example 43.46 mm. In such example use case, the base static installation tension BT may be recommended to be, for example 67 Newton, to be at or near an example optimum value. The distance D may be 0.04346 meters which is the radial distance between the first point of rotation P1 of the driving pulley 204 and the center of rotation C1 of the driving mechanism 212.

Accordingly, the required torque T may be calculated based on the expression (1) as 5.82 Newton meters (Nm). Based on the calculation, the drive device 302 may be required to turn the driving mechanism 212, such as a 16 mm hexagonal shaft, with 5.82 Nm to obtain the optimum belt tension BT.

Accordingly, the drive device 302 may be required to provide a torque T of 5.82 Nm. The drive device 302 may correspond to a tool that may be used to apply a specific torque to the driving mechanism 212 of the carrier unit 114A. The drive device 302 may allow an operator to apply the torque T to the driving mechanism 212 so that the belt tension BT of the drive belt 214 can be matched to the optimum pre-defined drive belt tension for a specific application. The accuracy of the drive device 302 may be confirmed based on a consistent or calibrated friction between the driving mechanism 212 and the mating hole of the drive device 302. Examples of the drive device 302 may include, but are not limited to, a beam-type torque wrench, an electronic torque wrench, a programmable electronic torque/angle wrench, a mechatronic torque wrench, or a hydraulic torque wrench.

In an example embodiment of the disclosure, while in operation, the belt tension BT of the drive belt 214 may change due to various factors, such as wear and tear, abrasion, or a dislocation of the driving pulley 204 with respect to the driven pulley 202. Due to such factors, the belt tension BT of the drive belt 214 may increase or decrease with respect to an optimum pre-defined drive belt tension of, for example 67 Newton, in accordance to the above described example use case. In such cases, the belt tension BT of the drive belt 214 may be required to reset back to the optimum pre-defined drive belt tension without use of any external measurement device, such as sonic meter, which is a significant technical advancement of the proposed method and system for tensioning the drive belt 214.

Accordingly, the operator may be required to loosen the plurality of locking bolts 208A to 208D so as to allow the driving mechanism 212 to rotate about the center of rotation C1 and the driving pulley shaft 205 to arcuately move through length of the radial driving pulley slot 210.

Once the plurality of locking bolts 208A to 208D are loosened, the operator may apply a torque T on the driving mechanism 212 about the center of rotation C1 of the drive assembly 252 using the drive device 302. The application of the torque T causes an arcuate motion of the driving pulley shaft 205 in the radial driving pulley slot 210 about the center of rotation C1 of the drive assembly 252 such that a distance between the driven pulley 202 and the driving pulley 204 is altered. Consequently, based on the applied torque T, a current perpendicular distance D defined between the first lateral axis L1 and the second lateral axis L2 is also changed. Thus, the current perpendicular distance D changes to an updated perpendicular distance D' (not shown) defined between an updated first lateral axis L1' (not shown) and an updated second lateral axis L2' (not shown). The updated first lateral axis L1' passes through an updated first point of rotation P1' (not shown) of the driving pulley 204 and the second point of rotation P2 (which is fixed). The updated second lateral axis L2' passes through the center of rotation C1 of the drive assembly 252 such that the updated first lateral axis L1' is parallel to the updated second lateral axis L2'.

Thus, based on the applied torque T about the center of rotation C1 of the drive assembly 252, the belt tension BT of the drive belt 214 may be adjusted to match with the optimum pre-defined drive belt tension of the drive belt 214 due to the altered distance between the driven pulley 202 and the driving pulley 204.

In various embodiments, the torque T may be applied in clockwise or counter-clockwise direction based on the current value of belt tension BT which is indirectly indicated by current distance D.

For example, in an embodiment, when the current distance D reduces during operation, the current value of belt tension BT becomes less than the optimum pre-defined drive belt tension, for example 67 Newton in accordance with the use case defined above. In such case, the calculated value of the torque T may be applied in clockwise direction resulting in the increased perpendicular distance D' between the updated first lateral axis L1' and the updated second lateral axis L2'. This may eventually lead to an increased distance between the driven pulley 202 and the driving pulley 204, thus an increased belt tension BT of the drive belt 214 gets matched with the optimum pre-defined drive belt tension of the drive belt 214. In such way, the drive belt 214 may be tensioned suitably.

In an alternate embodiment, when the current distance D increases during operation, the current value of belt tension BT exceeds the optimum pre-defined drive belt tension, for example 67 Newton in accordance with the use case defined above. In such case, the calculated value of torque T may be applied in anti-clockwise direction resulting in the decreased perpendicular distance D' between the updated first lateral axis L1' and the updated second lateral axis L2'. This may eventually, in some examples, lead to a reduced distance between the driven pulley 202 and the driving pulley 204, thus a reduced belt tension BT of the drive belt 214 gets matched with the optimum pre-defined drive belt tension of the drive belt 214. In such way, the drive belt 214 may be tensioned suitably.

The above embodiments may be better understood with different example scenarios, as described below. In a first scenario, at the same distance D, i.e. 0.04346 m, the torque T may be calculated as, for example, 5.96 NM (which is greater than 5.82 Nm). This may imply that the belt tension BT has increased to 68.5 N (at the same distance D=0.04346 m). Thus, the torque T may be required to be reduced by 0.14 Nm so that the required belt tension BT of 67 Newton may be achieved.

In a second scenario, it may be observed that the position of the first point of rotation P1 of the driving pulley 204 is such that the second point of rotation P2, the first point of rotation P1, and the center of rotation C1 form an acute angle, i.e. less than 90 degrees, at first point of rotation P1, as the current distance D is 0.04446 m. Consequently, the belt tension BT also changes, for example increases to 69 N. Accordingly, the torque T may be calculated as 6.14 Nm, which is 0.32 Nm greater than the initial calculated torque T of 5.82 Nm. Thus, the required change in the torque T may be calculated to be as −0.32 Nm, i.e. the torque T is now required to be reduced by 0.32 Nm by turning the drive device in anti-clockwise direction so that the distance D is also reduced by 0.0010 m, thus back to 0.04346 m, and the belt tension BT becomes 67 N which is the optimum pre-defined drive belt tension.

In a third scenario, it may be observed that the position of the first point of rotation P1 of the driving pulley 204 is such that the second point of rotation P2, the first point of rotation P1, and the center of rotation C1 form an obtuse angle, i.e. greater than 90 degrees, at first point of rotation P1 as the current distance D is 0.04246 m. Consequently, the belt tension BT also changes, for example decreases to 65 N. It may be noted that the decreased belt tension BT is not required to be measured. Accordingly, the torque T may be calculated as 5.51 Nm, which is 0.30 Nm less than initial torque T of 5.82 Nm. Thus, the required change in the torque T may be calculated to be as 0.33 Nm, i.e. the torque T is now required to be increased by 0.30 Nm by turning the drive device in clockwise direction so that the distance D is also increased by 0.0010 m, thus back to 0.04346 m, and the belt tension BT becomes 67 N which is the optimum pre-defined drive belt tension.

Figure 4:
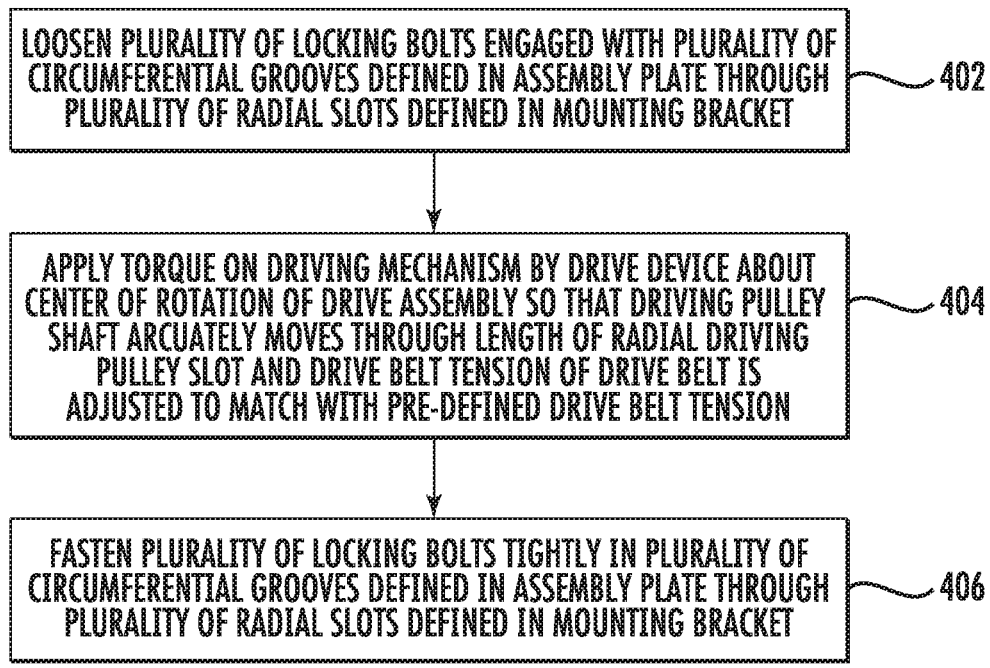
FIG. 4 illustrates an example flowchart of operations performed for tensioning the drive belt 214 of a carrier unit, such as the carrier unit 114A of a conveyor bed, in accordance with example embodiments of the present disclosure.

FIG. 4 illustrates an example flowchart of operations performed for tensioning the drive belt 214 of a carrier unit, such as the carrier unit 114A of a conveyor bed, such as the conveyor bed 104, in accordance with example embodiments of the present disclosure.

Turning to operation 402, bolts, such as the plurality of locking bolts 208A to 208D engaged with corresponding grooves, such as the plurality of circumferential grooves 222A to 222D, defined in an assembly plate, such as the assembly plate 220, may be loosened. Such plurality of locking bolts 208A to 208D are engaged with the plurality of circumferential grooves 222A to 222D through radial slots, such as the plurality of radial slots 206A to 206D, defined in a mounting bracket, such as the mounting bracket 200A. The mounting bracket 200A may be detachably attached to the drive assembly 254 in a drive belt tensioning system, such as the material handling system 100.

The plurality of locking bolts 208A to 208D may be loosened when the current belt tension BT of the drive belt 214 is observed to be different than the optimum pre-defined drive belt tension. The plurality of locking bolts 208A to 208D may be loosened while, for example, but not limited to, changing the drive belt 214 and installing a new belt. The current belt tension BT of the drive belt 214 may be observed to be different than the optimum pre-defined drive belt tension due to many factors in an operational environment. For example, damp or sticky particulate matter deposited and packed into pulley grooves may cause the belt tension to increase significantly. In another example, Urethane timing belts may swell in the presence of water that may increase the belt tension significantly. In other examples, environmental factors, such as radiation, temperature, and electrical charges may also tend to change the current belt tension BT of the drive belt 214.

Due to all the above factors, in certain cases, the current belt tension BT of the drive belt 214 may exceed the optimum pre-defined drive belt tension that may decrease the system bearing life due to excessive bearing loads, and eventually reduce the belt life of the drive belt 214 due to excessive belt tensile loads. In other cases, the current belt tension BT of the drive belt 214 may reduce with respect to the optimum pre-defined drive belt tension due to which the drive belt 214 may ratchet (i.e. skip teeth on pulleys) and eventually reduce the belt life of the drive belt 214 due to increased flex fatigue.

Thus, in order to increase the belt life of the drive belt 214, the operator may be required to achieve direct, easy, quick, precise, accurate and repeatable belt tension BT in the drive belt 214. In such cases, as described above, the tensioning method may be initiated by loosening the plurality of locking bolts 208A to 208D. In an embodiment, the plurality of locking bolts 208A to 208D may be loosened manually by the operator. In other embodiments, the plurality of locking bolts 208A to 208D may be loosened by a plurality of actuators (not shown).

Turning to operation 404, a torque T may be applied on a driving mechanism, such as the driving mechanism 212, by a drive device, such as the drive device 302, about the center of rotation C1 of the drive assembly 352. When the torque T is applied on the driving mechanism 212, the driving mechanism 212 rotates about the center of rotation C1 and consequently, the driving pulley shaft 205 arcuately moves through the length of the radial driving pulley slot 210 and belt tension BT of the drive belt 214 is altered based on the torque provided until the appropriate amount of torque is applied to match with the pre-defined drive belt tension.

The magnitude and direction of the torque T may be determined based on the expression (1) as described above in FIGS. 3A and 3B. Accordingly, the drive belt tension of the drive belt 214 may be adjusted to match with the pre-defined drive belt tension of the drive belt 214 based on an updated perpendicular distance D' between the updated first lateral axis L1' and an updated second lateral axis L2'. Effectively, upon the application of the torque T, the distance between the first point of rotation P1 of the driving pulley 204 may increase or decrease with respect to the second point of rotation P2 of the driven pulley 202.

Turning to operation 406, the plurality of locking bolts 208A to 208D may be engaged back with the plurality of circumferential grooves 222A to 222D defined in the assembly plate 220 through the plurality of radial slots 206A to 206D and fastened tightly. Once the plurality of locking bolts 208A to 208D is fastened tightly, the drive assembly 254 is locked and secured in place with respect to the mounting bracket 200A. Accordingly, any further movement of the drive assembly 254 with respect to the mounting bracket 200A may be prevented.

In accordance with various embodiments disclosed herein, the implementation of the system and method for tensioning an exemplary drive belt makes it easy to achieve proper belt tension during operation. It allows the use of a commonly available drive device, such as a torque wrench, to be used to achieve direct, accurate and repeatable belt tension for the drive belt. The disclosed system and method further don't require any additional equipment or apparatus to repeatedly measure the belt tension, thereby cutting down the additional cost and friction. Further the disclosed system and method is suitable for bi-directional (reversing) drive systems also. Thus, the disclosed system and method for tensioning the drive belts is easier, repeatable, faster and more accurate than other commonly used methods.

In some example embodiments, certain aspects of the operations herein may be modified or further amplified. Moreover, in an embodiment additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims Each and every claim is incorporated as further disclosure into the specification and the claims are embodiment(s) of the present disclosure(s). Furthermore, any advantages and features described above may relate to specific embodiments, but shall not limit the application of such issued claims to processes and structures accomplishing any or all of the above advantages or having any or all of the above features.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A drive belt tensioning system, comprising:
  a drive assembly comprising:
    an assembly plate;
    a driving mechanism rigidly affixed to the assembly plate, wherein a first axis of rotation of the driving mechanism perpendicular to the assembly plate defines a center of rotation of the drive assembly; and
    a driving pulley shaft protruding through the assembly plate,
      wherein the driving pulley shaft is positioned at a first radial distance from the center of rotation of the drive assembly and is configured to mate with a driving pulley sprocket wheel; and a mounting bracket detachably attached to the drive assembly and rigidly affixable orthogonally to a first surface of a carrier unit of a conveyor bed having a driven pulley,
   wherein the mounting bracket defines at least a shaft aperture that is sized to receive the driving mechanism and a radial driving pulley slot that extends circumferentially around at least a portion of the shaft aperture, the radial driving pulley slot sized to receive the driving pulley shaft,
   wherein an axis of rotation of the driving mechanism is coaxial with an axis of rotation of the radial driving pulley slot such that an application of torque on the driving mechanism about the center of rotation of the drive assembly causes arcuate motion of the driving pulley shaft in the radial driving pulley slot about the center of rotation of the drive assembly such that a distance between the driven pulley and the driving pulley is altered.

2. The drive belt tensioning system according to claim 1, wherein the drive assembly further comprises a drive motor having a drive pinion,
   wherein the drive pinion is attached to the driving pulley shaft and rotates the driving pulley shaft about a corresponding longitudinal axis.

3. The drive belt tensioning system according to claim 2, wherein the center of rotation of the drive assembly is defined based on the first axis of rotation of the driving mechanism,
   wherein the first axis of rotation of the driving mechanism is coaxial with an axis of rotation of the radial driving pulley slot,
   wherein a second axis of rotation of the drive pinion that is coaxial with an axis of rotation of the driving pulley shaft defines a first point of rotation of the driving pulley.

4. The drive belt tensioning system according to claim 3, wherein the applied torque allows the driving mechanism to rotate about the center of rotation and the driving pulley shaft to move through a length of the radial driving pulley slot,
   wherein, based on the applied torque, a current perpendicular distance defined between a first lateral axis and a second lateral axis is changed to an updated perpendicular distance defined between an updated first lateral axis and an updated second lateral axis,
   wherein the first lateral axis passes through the first point of rotation of the driving pulley and a second point of rotation corresponding to a third axis of rotation of the driven pulley shaft,
   wherein the second lateral axis passes through the center of rotation of the drive assembly such that the first lateral axis is parallel to the second lateral axis,
   wherein the updated first lateral axis passes through an updated first point of rotation of the driving pulley and the second point of rotation, and
   wherein the updated second lateral axis passes through the center of rotation of the drive assembly such that the updated first lateral axis is parallel to the updated second lateral axis.

5. The drive belt tensioning system according to claim 4, wherein, based on the applied torque driving mechanism resulting in the updated perpendicular distance between the updated first lateral axis and the updated second lateral axis, a drive belt tension of the drive belt is adjusted to match with a pre-defined drive belt tension of the drive belt due to the altered distance between the driven pulley and the driving pulley upon the applied torque on the driving mechanism about the center of rotation of the drive assembly
   wherein the drive belt mates with the driving pulley sprocket wheel of the driving pulley and a driven pulley sprocket wheel of the driven pulley.

6. The drive belt tensioning system according to claim 5, wherein the driven pulley sprocket wheel is received at an end portion of the driven pulley,
   wherein a cross belt of the carrier unit of the conveyor bed mates with the driven pulley and another pulley of the carrier unit.

7. The drive belt tensioning system according to claim 4, wherein, based on the applied torque in clockwise direction resulting in the updated perpendicular distance between the updated first lateral axis and the updated second lateral axis, a drive belt tension of a drive belt increases to match with an optimum pre-defined drive belt tension of the drive belt.

8. The drive belt tensioning system according to claim 4, wherein, based on the applied torque in anti-clockwise direction resulting in the updated perpendicular distance between the updated first lateral axis and the updated second lateral axis, a drive belt tension of the drive belt decreases to match with an optimum pre-defined drive belt tension of the drive belt.

9. The drive belt tensioning system according to claim 4, wherein the assembly plate further defines a plurality of circumferential grooves configured to receive a plurality of locking bolts through a plurality of radial slots defined on the mounting bracket,
   wherein an axis of rotation of the plurality of radial slots is coaxial with the first axis of rotation of the driving mechanism.

10. The drive belt tensioning system according to claim 9, wherein the plurality of locking bolts is configured to be loosened so as to allow the driving mechanism to rotate about the center of rotation and the driving pulley shaft to arcuately move through length of the radial driving pulley slot.

11. The drive belt tensioning system according to claim 9, wherein the plurality of locking bolts is fastened tightly in the plurality of circumferential grooves after the application of the torque on the driving mechanism.

12. The drive belt tensioning system according to claim 1, wherein the driving mechanism is one of a shaft of a defined shape and dimensions, a nut shaft of a specific shape and dimensions rigidly fixed on the assembly plate, a slot, or a socket head drive style in accordance with available space and access requirements.

13. The drive belt tensioning system according to claim 1, wherein the driving pulley shaft receives a driving sprocket wheel from opposite surface of the assembly plate.

* * * * *